United States Patent [19]

Keznickl

[11] Patent Number: 4,718,775
[45] Date of Patent: Jan. 12, 1988

[54] FEVER THERMOMETER

[75] Inventor: Eduard Keznickl, Vienna, Austria

[73] Assignee: Elkon Erzeugung Von Elektronischen Geraten Gesellschaft m.b.H., Vienna, Austria

[21] Appl. No.: 501,280

[22] Filed: Jun. 6, 1983

[30] Foreign Application Priority Data

Jun. 8, 1982 [AT] Austria ................................ 2226/82

[51] Int. Cl.⁴ ........................ H05B 7/144; G01K 1/08
[52] U.S. Cl. ................................ 374/104; 200/61.53;
364/557; 374/208
[58] Field of Search ........... 200/52 R, 61.53, 61.45 R,
200/61.52; 374/102, 103, 108, 163, 170, 183,
195, 104, 208; 364/557

[56] References Cited

U.S. PATENT DOCUMENTS

| 2,997,557 | 8/1961 | Gillmor et al. | 200/61.52 X |
| 3,935,701 | 2/1976 | Yamauchi et al. | 200/61.52 X |
| 4,020,302 | 4/1977 | Hasegawa et al. | 200/61.45 R |
| 4,447,884 | 5/1984 | Wada | 374/102 X |

FOREIGN PATENT DOCUMENTS 2515635 10/1976 Fed. Rep. of Germany .
1537777  1/1979 United Kingdom .

Primary Examiner—J. R. Scott
Attorney, Agent, or Firm—Young & Thompson

[57] ABSTRACT

A fever thermometer comprises a rod-shaped housing containing at one end an electric temperature sensor, a battery at the other end, an electronic temperature display, and an inertial switch which when actuated resets the temperature display from the measured value to a predetermined base value. The inertial switch is actuated by the same motion as that used to shake down a conventional fever thermometer.

8 Claims, 6 Drawing Figures

FEVER THERMOMETER

BACKGROUND OF THE INVENTION

The invention relates to a fever thermometer with at least one switching section for the adjustment and/or interruption of an electronic connection and with an actuating element.

Conventional fever thermometers operate according to the principle of thermal expansion of liquid bodies or according to the principle of changing the electric resistance of a conductor in dependence on the temperature.

The mercury thermometers, which have been known for a long time, exhibit grave disadvantages despite their widespread usage.

One disadvantage resides in great fragility. In case of breakage, there occurs not only destruction of the fever thermometer, rendering it useless, but the leakage of toxic mercury can also lead to health damage and the glass shards can cause injuries, particularly with children.

Another drawback lies in poor legibility of the mercury column in the thin glass tube.

Although conventional electronic fever thermometers eliminate these disadvantages, they exhibit other deficiencies which heretofore have precluded any appreciable popularity.

The circumstance that the measuring probe is separated from the indicating device has disadvantageous consequences in usage and is expensive. The connecting cable necessary in this arrangement interferes with handling and storage. The indicating device must be held during measurement or somehow deposited, which is in contrast to conventional procedures in measuring body temperature. The known electronic fever thermometers are equipped with push button switches or sliding switches for the activation or deactivation, as well as for calibration control.

These operating elements are unfamiliar and require special instructions.

Another disadvantage of these switches is that they require openings in the casing. Such gaps and openings are undesirable for hygienic reasons and moreover make sterilization impossible.

Another basic deficiency of these conventional switches resides in that they can be accidentally actuated, which normally leads to a discharge of the battery.

The invention is based on the object of avoiding the drawbacks of the conventional switch constructions, specifically as far as their use for electronic fever thermometers is concerned.

This object has been attained according to the invention by providing that the actuating element of the switch comprises at least one mass arranged to be mobile at least to some degree of freedom, wherein this mass in case of movement according to its degree of freedom cooperates indirectly or directly with the switching section and, if a fixedly determined force exerted by the mass has been exceeded, effects switch-over of the switching section from a first switching status into a second switching status, the voluntary triggering of the switching process being inducible by acceleration of the mass in correspondence with the direction of the degree of freedom thereof.

Additional advantages of the invention result if the switching section and the actuating element are arranged in a hermetically sealed fashion.

When applied to electronic fever thermometers, all of the disadvantages of the conventional constructions are avoided.

It is possible to construct the appliance in such a way that it satisfies all requirements with respect to hygiene and measuring practice when handled by unskilled personnel as well as in clinical usage.

It is advantageous to combine the measuring probe, the electronic circuit, the switching element, the current supply, and the indicating unit in a preferably hermetically sealed housing; in this connection, it is readily possible to control, by means of the "centrifugal switch", even rather complicated measuring programs.

Thus, for example, with a single operation of the switch, the electronic programming unit (for instance a microprocessor) can switch to battery control and/or to control of calibration status. Upon a further actuation of the switch, the device switches over automatically to temperature measurement, yielding a maximum value indication, which latter can be erased again by another actuation of the switch, the device being reset to a preselected temperature value.

Deactivation of the appliance takes place advantageously after a predetermined time period following the last operation of the switch. Additional features of the invention can be seen from the following description of several embodiments and in connection with the drawings.

DESCRIPTION OF THE PREFERRED EMBODIMENTS

Figure 1:
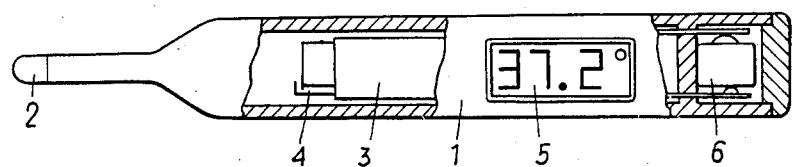
FIG. 1 illustrates a fever thermometer according to the invention, partially in a sectional view.

The fever thermometer according to FIG. 1 contains, in a housing 1, a measuring probe 2, an electronic measuring unit 3, a switching element, the so-called "centrifugal switch" 4, as well as an indicating device 5. A battery 6 is accommodated in a housing part which can be closed with a lid, preferably a sealable screw closure.

Preferably, the bores from the battery chamber into the main casing are fashioned to be hermetically tight.

Figure 2:
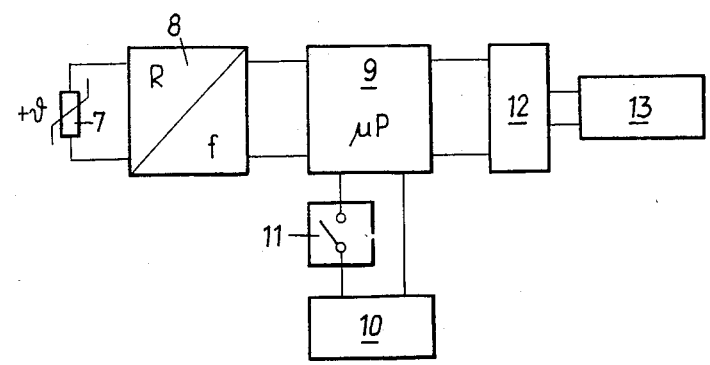
FIG. 2 shows the associated block circuit diagram.

FIG. 2 shows the electronic construction of the appliance. A temperature-dependent resistor 7 is connected to a resistance-frequency convertor 8 and yields a temperature-proportional frequency which is applied to a microprocessor 9. The microprocessor 9 controls the position of a switch 11 and, via its program, by way of a display driver 12, actuates a display 13 indicating the calibration status or respectively the temperature. A current supply 10 is likewise connected to the microprocessor 9.

Figure 3:
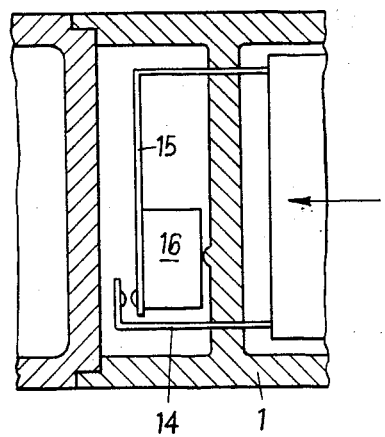
FIGS. 3–5 show various embodiments for the "centrifugal switch".

FIG. 3 shows a first embodiment of a so-called "centrifugal switch".

A rigid contact tongue 14 and a resilient contact tongue 15 are arranged in the housing 1. A weight 16 is connected with the movable tongue 15 and, in the rest condition, is in contact with the housing 1. The contacts are open. At a tossing movement in the direction of the arrow, the mass inertia of the weight effects liftoff of the resilient contact tongue 15 from the housing wall and closing of the pair of contacts for a brief period of time.

Figure 4:
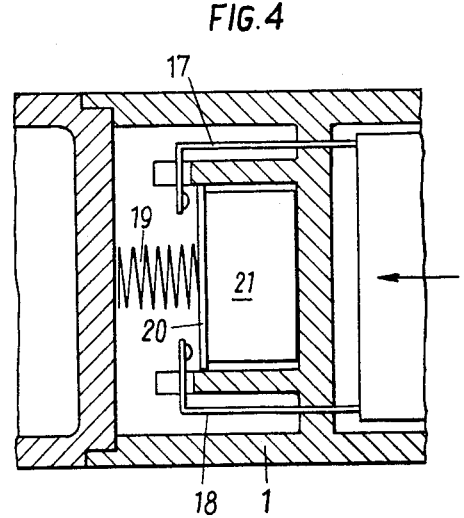

Another embodiment of a switch is shown in FIG. 4. Rigid contact tongues 17 and 18 are supported within the housing 1. A spring 19 urges a contact element 20 against a weight 21, and the latter against the housing wall. Upon a tossing movement in the direction of the arrow, a short-term closing of the contacts is effected.

Figure 5:
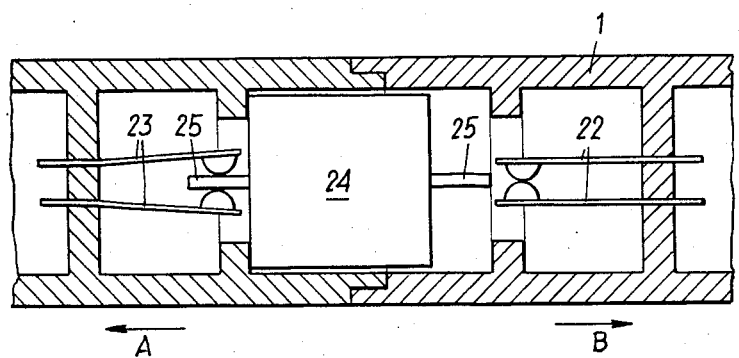

One example for a reversing switch according to the idea of this invention is illustrated in FIG. 5.

A housing 1 with pairs of contacts 22 and 23 accommodates displaceably a weight 24 with two tongues 25 of an insulating material. In case of a flinging motion in the direction A, the contacts 22 are closed and the contacts 23 are opened, whereas with a flinging motion in direction B, the contacts 23 are closed and the contacts 22 are opened.

Figure 6:
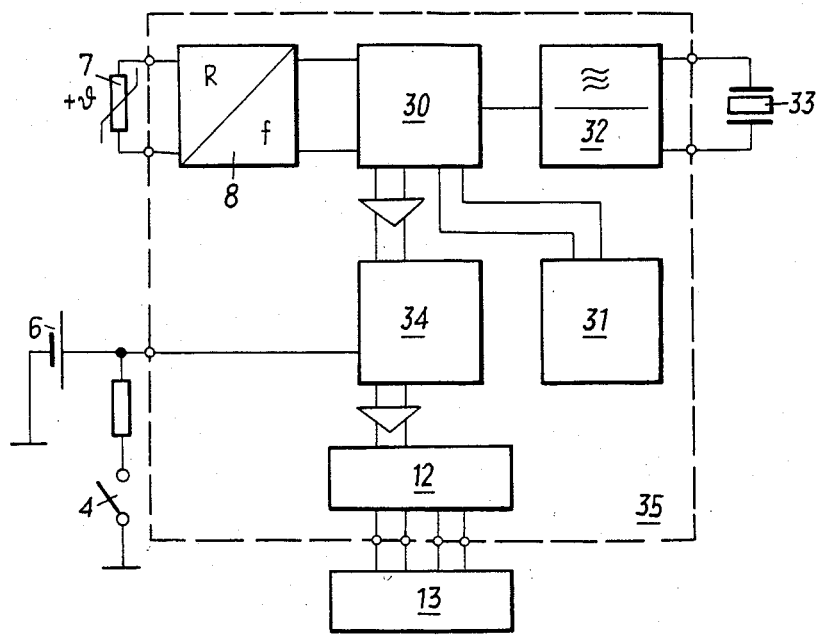
FIG. 6 represents the block circuit diagram of a modification of the circuit of FIG. 2.

FIG. 6 shows a block circuit diagram of another version of a fever thermometer:

Instead of a microprocessor, this circuit comprises a highly integrated digital switching circuit, encompassing the entire evaluating circuitry.

The analog signal from temperature sensor 7 is converted into digital pulses in the resistance-frequency convertor; these pulses are transmitted to a counting stage 30.

In a digital comparator 31, the signals from counting stage 30 are compared with the output pulses from a reference oscillator 32.

As the frequency standard, a quartz resonator 33 is provided, the frequency of which is divided in the oscillator stage.

The output signal from the digital comparator 31 passes via a register 34 and the display driver 12 to the display 13.

The circuit is supplied by the battery 6 via the "centrifugal switch" 4.

The individual stages are connected to the current source 6 by way of conductors, not shown; a "reset line" transmits the switching signal from the centrifugal switch to the individual stages and resets same into the initial position.

The circuit 35 contains the entire evaluating circuit and can be designed either as a so-called user IC or as a so-called "ULA" wherein the various logic digital stages are integrated into the desired circuit configuration by means of a single mask specific to the customer.

The invention is not limited to the illustrated examples. For example, the temperature indication can take place analogously in a bar shape, similar to a mercury column, instead of the illustrated indication by means of a digital display.

The indication of the calibration status can be switched over automatically into the measuring display after a certain period following activation. The microprocessor permits flashing of the indicator display as long as the temperature indication is rising, i.e. as long as the gradient of temperature increase in the measuring probe has a certain magnitude. This indication can also take place acoustically.

The microprocessor is also capable of calculating the end point from a few measuring points at the beginning of measurement, thus making measurement within seconds possible.

With the battery qualities available nowadays, for example lithium batteries, it is possible to equip the thermometer with a lifetime battery. This makes the lid for the battery chamber dispensable and permits construction of a hermetically sealed appliance.

A version exhibiting piezo effect is possible instead of the aforedescribed switch. The switch can be of the multipole type and can consist of rest and working contacts.

Combination of this thermometer or parts thereof with other devices, for example a clock, is possible.

It is also feasible to equip an electronic clock, for example a wristwatch, with the "centrifugal switch", wherein the various programs are selected by an appropriate number of operations.

The threshold value for acceleration to activate the switch must be adapted to the respective usage. A watch equipped with the "centrifugal switch" of this invention requires no mechanical bores and therefore can be hermetically sealed.

I claim:

1. An electronic fever thermometer comprising a substantially rod-shaped housing containing at one end an electric temperature sensor, switching circuitry, a measured value memory for storing a maximum temperature value measured, a reset device for said measured value memory, a display for indicating the stored content of the memory, and an inertial switch in the housing comprising a mass movable in the direction of the longitudinal axis of the rod-shaped housing upon the imposition of inertia greater than the force of gravity, to a position in which the switch resets the memory to delete the indication of the maximum value of temperature.

2. A fever thermometer as claimed in claim 1, and a battery within the housing.

3. A fever thermometer as claimed in claim 2, said battery being disposed at the end of the housing opposite the temperature sensor.

4. A fever thermometer as claimed in claim 3, the battery being permanently sealed in the housing.

5. A fever thermometer as claimed in claim 3, and a removable enclosure at said other end of the housing for selectively exposing the battery for replacement.

6. A fever thermometer as claimed in claim 1, and a timing circuit which is started by said inertial switch and which deactivates the switching circuit, the memory and the display after a predetermined lapse of time.

7. An electronic fever thermometer comprising a substantially rod-shaped housing, an electric temperature sensor at one end of the housing, an electric display of temperature carried by the housing for displaying temperature sensed by said sensor, and an inertial switch in the housing containing a mass movable in the direction of the longitudinal axis of the housing under the influence of an inertial force greater than the force of gravity, to a position in which the display of the temperature is reset to a predetermined value lower than the maximum displayed value.

8. A fever thermometer as claimed in claim 7, and means at the other end of the housing to receive a battery for actuating the thermometer.

* * * * *